United States Patent Office 3,150,289
Patented Sept. 22, 1964

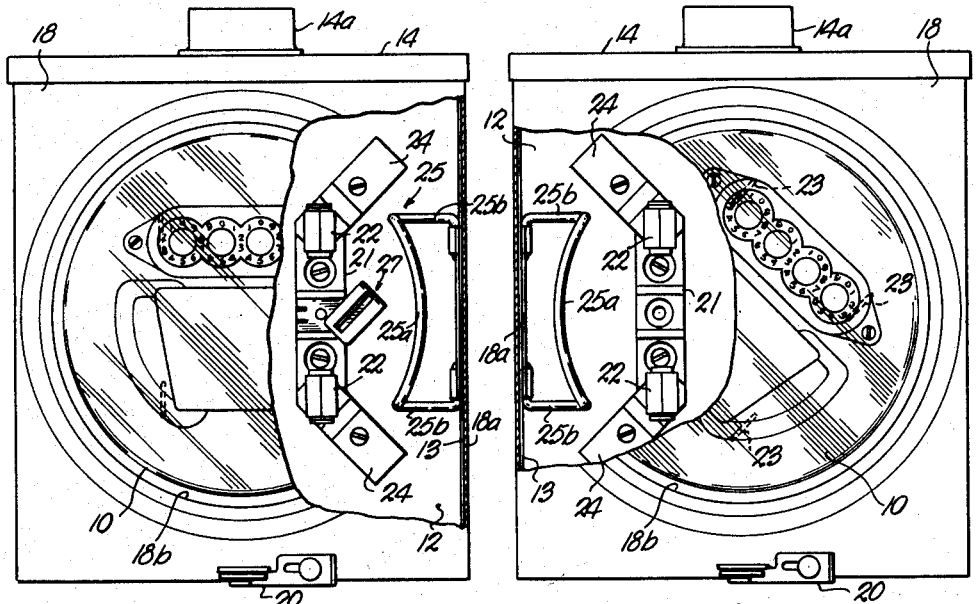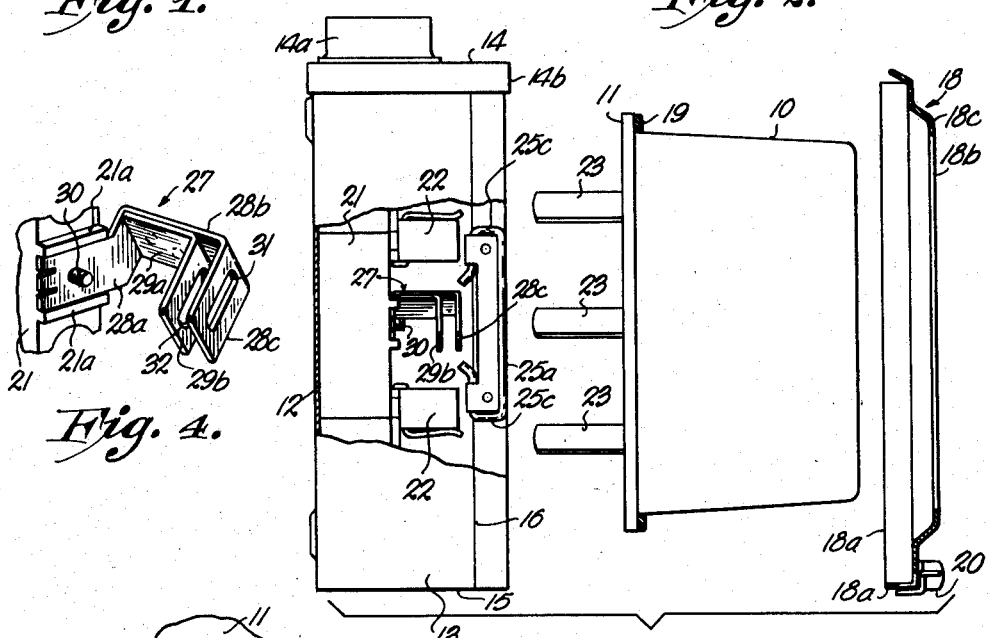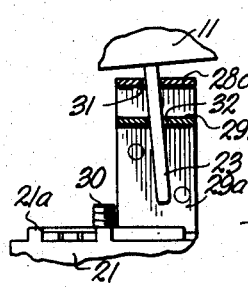

3,150,289
OUT OF SERVICE STRUCTURE IN METER SOCKETS
Robert F. Waldrop, Mission Hills, Kans., assignor to Milbank Manufacturing Co., Inc., Kokomo, Ind., a corporation of Indiana
Filed Apr. 9, 1962, Ser. No. 185,935
7 Claims. (Cl. 317—104)

This invention relates to electric meter receptacles and refers more particularly to a receptacle for receiving detachable meters such as watt hour meters, and of the type in which the meter is sealed in the receptacle by a removable cover.

One of the important objects of the invention is to provide a receptacle of the character described which is provided with unique structure for supporting the meter when the latter is in "out of service" position.

As is known to those versed in the art, the conventional detachable watt hour meter base is provided with a plurality of projecting contact blades. The usual receptacle or box has mounted in its interior a corresponding number of jaw terminals which are so located as to receive the blade contacts of the meter when the base is properly oriented with respect thereto.

So long as the meter is installed in the box and "in service" position, i.e., a position where the current flow is being registered in the meter, present boxes are fully adequate. However, there are many instances where it would be desirable to provide an arrangement wherein the meter could be disconnected electrically from the system, but still stored in the box so that when it is desired to restore service, this can be done by simply repositioning the meter back to the "in service" position. Various proposals have been made for accomplishing this; however, the present invention is believed to represent a considerable improvement over those presently known from the standpoint not only of ease of use, but also in manufacturing and assembly costs.

By my invention I provide a meter receptacle which includes unique means for supporting the meter in the receptacle independently of the cover when the meter is disposed in its "out of service" position, that is, when the blade contacts of the meter are out of engagement with the jaw terminals of the box. In the preferred form of the invention the support means is fully capable of supporting the meter in the absence of the cover which makes installation or shifting of the positions of the meter between "in service" and "out of service" condition a matter of easy accomplishment, and permits such installation and shifting without danger of breakage of the meter due to accidental falls.

A further object of the invention is to provide a meter receptacle equipped with structure of the character described and which requires no manipulation of supplemental latches or locking elements, or of application of undue pressure to the meter. It is a feature of the invention that through the specific structure employed for maintaining the meter in "out of service" position, the weight of the meter itself assists in maintaining the meter in substantially immovable condition in the receptacle. In other words, I do not rely upon resilient clamps or other mechanisms for holding the meter in place in the "out of service" condition, and therefore there is little likelihood of accidental disconnection.

Other and further objects of the invention together with the features of novelty appurtenant thereto will appear in the course of the following description.

In the accompanying drawings which form a part of the specification and are to be read in conjunction therewith, and in which like reference numerals indicate like parts in the various views;

FIG. 1 is a front view of a meter receptacle embodying the features of the invention, a typical meter being positioned therein in the "in service" position, portions of the receptacle and meter being broken away for the purposes of illustration;

FIG. 2 is a view similar to FIG. 1, but showing the meter turned to its "out of service" position, again portions of the meter and receptacle being broken away to expose certain internal structure;

FIG. 3 is a view showing the meter, the receptacle and cover for the receptacle in exploded relationship, the view being taken generally from the left hand side of FIG. 2 with portions of the near side wall of the receptacle broken away to expose the internal structure;

FIG. 4 is an enlarged fragmentary perspective view of the interior of the receptacle and showing in particular the "out of service" meter support bracket;

FIG. 5 is an enlarged fragmentary cross sectional view through the bracket of FIG. 4 showing in connection therewith a blade of the meter inserted therein.

Referring to the drawings, reference numeral 10 indicates generally the transparent enclosure of a typical watt hour meter, the enclosure being mounted on a circular base 11 of greater diameter than the enclosure. Within the enclosure is housed the usual rate determining mechanism which is of conventional construction. Since the details of the internal construction of the meter play no part in the present invention, they will not be further described.

The main body of the receptacle comprises preferably a rectangular housing or box having a back wall 12, side walls 13, upper end wall 14, and a bottom end wall 15. An outlet hub 14a may be provided on the upper end wall 14 or on any other wall desired. The vertical side walls 13 are slightly inset at their outer edges, as at 16, for a purpose later to be described. The upper end wall 14 is provided with a front depending flange 14b whose inside surface is spaced slightly from the edges of the side walls 13. Within this space is received the upper end of a cover 18. The side and lower edges of cover 18 are provided with flanges 18a which fit over the edges of the side and bottom walls when the cover is closed on the box. The cover 18 has a central aperture 18b therein which is of a diameter slightly greater than the diameter of the glass enclosure 10 of the meter, so that with the meter disposed in the position shown in FIGS. 1 and 2, the cover can be positioned on the box with the enclosure 10 projecting through the aperture and the flanges 18a over-lapping the corresponding marginal portions of the side and bottom walls of the box. The cover may be embossed to provide the annular shoulder 18c and an annular resilient sealing gasket 19, which may be made of any rubber-like material, either solid or cellular, may be disposed between the base of the meter and the inside surface of the shoulder 18c around opening 18d to make the assembly weather-tight.

A latching mechanism is provided at the bottom of the cover as indicated at 20, but this is conventional in construction and no further description will be given.

Turning now to the interior of the box, mounted within the box and secured to the back wall 12 are a pair of parallel insulating blocks 21. These blocks carry in the usual fashion jaw terminals 22, the present box carrying four such terminals. The jaw terminals are so spaced as to receive, when the meter is installed in the "in service" condition, blade terminals 23 secured to and forming a part of the meter. Each jaw terminal 22 has associated with it a lay-in or wire receiving terminal 24 which may be of any convenient construction.

Also located in the interior of the box and near the opposite side walls are the meter positioning supports 25.

Each of these comprises a length of rod bent to provide an arcuate portion 25a disposed generally in a plane parallel with the back wall of the meter socket or box. Each arcuate portion is supported at its ends by interconnected sections 25b, 25c which are secured to a bracket 26 mounted to the side walls of the box. The arcuate portions 25a are disposed to engage the base of the meter and limit its inward penetration into the box so that when the cover 18 is installed it will properly cooperate with the meter base 11 to form a weather-tight seal.

Referring now more particularly to FIGS. 1 and 3–5, inclusive, mounted on the right hand terminal block 21 (as viewed in FIG. 1) is the "out of service" blade receiving bracket 27. This bracket in its preferred form comprises the main section 28 having the base leg 28a secured to the face of the block 21 as by screw 30, an outwardly extending leg 28b and a reversely bent end section 28c. The base leg is stabilized against twisting on the block by the ribs 21a on the latter. Disposed on the inside face of leg 28b and secured thereto as by spot welding is the leg 29a of a member having an end section 29b parallel with but spaced inwardly from the end section 28c.

Each of the sections 28c, 29b is provided with an elongate slot 31, 32 of slightly greater width and length than the corresponding cross sectional dimensions of a meter blade 23. The slots are so arranged that their respective long axes are rotated approximately 45° from the plane of the meter blades when the latter is in its normal "in service" position, and are centered on a hypothetical circle having its center equidistant from the jaw terminals and passing through the midpoints thereof.

As may best be seen from FIGS. 1 and 5, the slots 31, 32 are so located relative to one another that to insert a meter blade therethrough, the meter must be tipped upwardly slightly away from a position in which the base of the meter is parallel with the back wall of the box. In other words, the uppermost surface or long edge of slot 32 is slightly below the corresponding surface of slot 31. The same relationship holds true between the lowermost long edges or surfaces of slots 31 and 32.

The operation of the invention is as follows. FIG. 1 shows the meter in the normal "inservice" position. In this position the blades 23 are received in the jaw terminals 22.

To put the meter in "out of service" position the cover 18 is unlatched and removed and the meter is withdrawn from the socket. The meter is then turned 45° clockwise (as viewed in FIGS. 1 and 2) and reinserted with the upper right hand blade terminal of the meter passing into and through the slots 31, 32 of the bracket 27. As previously noted, in order to obtain the insertion of the blade through the slots it is necessary to tilt the upper end of the meter slightly toward the base or back wall of the box. The meter is inserted until the base is engaged by the brackets 25. When the tilting force applied by the hand to the meter is removed, the meter base will settle against the brackets and at the same time the blade 23, which is in bracket 27, will be subjected to a very slight flexural force by reason of the offset of the slots 31, 32. This may best be appreciated by looking at FIG. 5. The meter is there shown in the slightly tilted position. Obviously when tilting force is removed, the blade will tend to bear against oppositely disposed edges of slots 31, 32, establishing firm frictional contact between the blade and the surfaces. Because of this frictional contact it is difficult to withdraw the meter from bracket 27 without first again tilting it slightly upwardly to free the blade from tight contact with such surfaces.

It will be evident that with the meter position in the "out of service" position as illustrated in FIG. 2, none of the terminals 23 are in contact with the jaw terminal 22, and therefore, no power will be applied to the meter. However the cover can be replaced and locked into closed position so that the meter may be left in the socket until it is desired to reestablish its operating connection.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. In a structure for receiving an electrical instrument of the type having a base and blade projecting from the base, the combination of an open front box having a back wall and side walls and adapted to receive said base with the blades extending toward the back wall, jaw terminals mounted in said box and positioned to receive said blades when the blades are aligned therewith, an out of service support bracket also mounted within said box and offset from said jaw terminals, said support bracket comprising a pair of blade engaging members providing a pair of surfaces spaced respectively at different distances from said back wall and adapted to engage opposite sides of a single blade with the outermost surface below the blade and the innermost surface above the blade, said surfaces supporting said meter with the blades thereof spaced laterally from and out of contact with said jaw terminals.

2. The combination as in claim 1 wherein said surfaces are so disposed that when said single blade is in position in said support it is under flexural stress thus establishing tight frictional contact between said surfaces and the blade.

3. The combination as in claim 1 wherein said blade engaging members comprise parallel plate elements provided with elongate apertures, the opposite edges on the respective apertures providing said surfaces.

4. In a meter receptacle for a blade type meter, an out of service support comprising a bracket secured to said receptacle and adapted to loosely receive a blade of the meter, said bracket comprising a pair of parallel plate members provided with surfaces which cooperate with a blade of the meter with the respective surfaces spaced longitudinally of the blade and on opposite sides thereof, said bracket so disposed that the weight of the meter causes flexural beam stresses in the blade in the zone between said surfaces.

5. In a meter receptacle for a blade type meter, an out of service support comprising a bracket secured to said receptacle and adapted to loosely receive a blade of the meter, said bracket comprising a pair of parallel plate members provided with elongate apertures, the plate members being disposed at differing distances from the back wall of the receptacle, said apertures adapted to loosely receive a blade of the meter and to frictionally engage and hold same.

6. In a receptacle for an electrical instrument of the type having a circular base surmounted on one face by an instrument enclosure, the enclosure being of lesser diameter than the base and the base having on its exposed face axially projecting contact blades, the combination of an open front box having a back wall and side walls and in which said base can be positioned, insulation blocks mounted on the back wall of the box, jaw terminals mounted on said insulation blocks and spaced in accordance with said contact blades of the electrical instrument so that when the contact blades are aligned with the jaw terminals and the instrument base is moved into the box the blades will be detachably received in the jaw terminals, positioning means also disposed within said box and operable to retain the instrument base therein when said instrument is inserted with the blades out of alignment with said jaw terminals and out of electrical contact therewith, said positioning means including a support structure secured to the back wall and offset laterally from said jaw terminals and adapted to cooperate with a blade and to carry said meter in a position wherein the blades are offset to the sides of the jaw terminals, said support structure comprising a pair of stationary surfaces spaced respectively at different distances from said back wall and positioned to contact opposite sides of the blade and to support at least a portion of the weight of the meter through the blade, a detachable cover for the front of said box, said cover having an opening of a diameter to receive therethrough said instrument enclosure but smaller than the diameter of said base, and means for releasably locking said cover in place on the box.

7. A receptacle as in claim 6 including stop members within the box arranged to limit the inward movement of the base within the box to a predetermined maximum.

References Cited in the file of this patent
UNITED STATES PATENTS
2,907,928    Rutledge et al. _____ Oct. 6, 1959